United States Patent [19]

Fournier et al.

[11] Patent Number: 4,485,970
[45] Date of Patent: Dec. 4, 1984

[54] THRUST REVERSAL DEVICE FOR AIR-CRAFT TURBOJETS

[75] Inventors: Alain M. Fournier, Clamart; John F. Kennedy, Boulogne, both of France

[73] Assignee: Societe de Construction des Avions Hurel-Dubois, Meudon la Foret, France

[21] Appl. No.: 381,795

[22] Filed: May 25, 1982

[30] Foreign Application Priority Data

May 29, 1981 [FR] France ................ 81 10693

[51] Int. Cl.³ .............................................. F02K 1/62
[52] U.S. Cl. ............................ 239/265.29; 60/226.2; 244/110 B
[58] Field of Search ............ 239/265.29, 265.27; 60/226.2, 230; 244/110 B, 12.5, 23 D

[56] References Cited

U.S. PATENT DOCUMENTS

| 3,279,182 | 10/1966 | Helmintoller | 60/226.2 |
| 3,475,913 | 11/1969 | Mortlock et al. | 239/265.29 |
| 3,531,049 | 9/1970 | Hom | 239/265.29 |
| 3,601,992 | 8/1970 | Maison | 239/265.29 |
| 3,647,141 | 3/1972 | Murday | 239/265.29 |
| 3,699,682 | 10/1972 | Kleckner | 60/266.2 |
| 3,764,096 | 10/1973 | Wright | 239/265.29 |
| 4,052,007 | 10/1977 | Willard | 239/265.29 |

FOREIGN PATENT DOCUMENTS 43764  1/1982  European Pat. Off. ............ 60/226.2

Primary Examiner—John J. Love
Assistant Examiner—Michael J. Forman
Attorney, Agent, or Firm—Charles E. Baxley

[57] ABSTRACT

The invention relates to thrust reversal devices for jet aircraft turboreactors and particularly for a turbo-fan type engine.

The casing E surrounding the engine structure D comprises an intermediate section S3 formed by doors P4 pivoting about an axis 17-17' extending along a chord of passage CA so that the rear part of the door is short, which provides considerable clearance for the doors which may open up to 90°, as well as an action of flux F1 flowing in the passage promoting opening of the doors. A jack 21 coupled to each of the doors acts between the fixed structure of the casing and the internal part of the door.

11 Claims, 5 Drawing Figures

THRUST REVERSAL DEVICE FOR AIR-CRAFT TURBOJETS

The present invention relates to a thrust reversal device for a turbojet of the turbofan type comprising an outer casing surrounding an engine structure which defines therewith an annular passage for the flow of a gas flux generated for example by a front fan. More particularly, the invention relates to a reversal device which is formed by movable elements of an intermediate section of the casing which may pivot from an inactive position in which they form a prolongation of the fixed part of the casing to a reversal position in which they extend transversely to the annular passage which they close off while freeing in the casing a passage for deflecting the flux outwardly and upstream. Such a device is already known, more especially from French Pat. No. 1482538 in which the movable elements are formed by doors, called segments in patent No. 1482538, hinged in an intermediate zone of their length to the fixed part of the casing, these doors thus having upstream and downstream parts which, in the reversal position, project respectively outside the casing for the upstream part and close off the annular passage for the downstream part, said doors being moreover operated by actuating members or jacks, connected on the one hand to the fixed upstream section of the casing and, on the other hand, in a region of the doors situated between the zone thereof hinged to the casing and their upstream end.

In French Pat. No. 1482538, the number of pivoting doors is high (more than twenty) and overlap each other. The result is, on the one hand, a great mechanical complexity of the device requiring perfect synchronism of the operation of the doors by their jacks.

Moreover, the large number of jacks (more than twenty) and of the hinging points of the doors necessarily causes a prejudicial increase in weight and in the manufacturing cost. Furthermore, the special geometry of the doors of patent No. 1482538 and particularly the fact that the pivoting axis is entirely situated in the thickness of the casing causes unfavorable operating conditions for the jacks during opening of the doors. In fact, at the beginning of opening, the lever arm of the jacks is very small and the rods thereof work under compression and are thus subjected to a considerable buckling force. At the same time, the overall power required of the jacks during opening must be sufficient to overcome the resisting force of the whole of the flux flowing in the annular passage which is exerted on the downstream part of the doors which represents a half of the area thereof. Finally, the opening angle of the doors is relatively small and does not exceed 45° with respect to the longitudinal axis of the engine so that the air-brake effect created by the upstream part of the doors is small and the passages freed in the casing for the discharge of the drive flux are restricted.

The present invention proposes an improved reversal device which eliminates all these disadvantages and presents a great structural and operational simplicity allied to a considerable reduction in weight with respect to known devices, accompanied by a significant improvement of the reversal effect.

To attain this aim, the reversal device of the invention is formed by a limited number of doors, preferably less than six, and in its most general aspect said reversal device is characterized by the fact that it comprises, in addition to the jacks for actuating the doors, means for assisting the opening of the doors acting as soon as the doors begin to pivot.

In a particularly advantageous way, in a preferred embodiment of the invention, the means for assisting the opening are formed by a zone of the doors themselves, on which the thrust of the flux flowing in the annular passage exerts a reverse action to that which it exerts on the downstream part of the door. Thus, the geometrical axis around which each door pivots is formed by a chord of the annular passage, whose middle point is approximately equally spaced from the outer periphery of the casing and from the outer surface of the structure of the engine. Thus, as soon as the doors begin to open, the thrust of the flux exerted on the part of the doors situated between the pivoting axis and the casing assists opening by counterbalancing the reverse direction thrust exerted on the part of the door downstream of the pivoting axis. Because of this effect, it is possible to use relatively low-powered jacks for actuating the doors, since they will essentially serve for braking the opening of the doors as soon as these latter begin to open, since the upstream part of the door, by acting as an air-brake also has an action in the opening direction. Thus, the jacks are essentially subjected to tensile forces without risk of buckling contrary to what happens especially in patent No. 1482538 and reduced sections may be used, which results in a reduction of weight and of the space required.

The jacks may be coupled to any zone of the doors between their pivoting axis and their upstream end. However, it has been found in accordance with the invention that the optimum position for the coupling point of the jack to the door must be situated approximately halfway between the upstream and downstream ends thereof, which provides the jack with sufficient leverage for the whole of the opening movement, ensures good stability of the door, optimum distribution of the forces thereon and consequently optimization of the mechanical structure with a resulting minimum door weight.

Similarly, it will be advantageous for the geometrical pivoting axis of each door to be situated approximately halfway between this coupling point and the downstream end of the door so that the length of the downstream part measured in the middle zone of the door is about three times shorter than the length of the upstream part. With this relative arrangement of the pivoting axis with respect to the casing and with respect to the coupling point of the jack, the opening angle of the doors in the completely opened out position may be much greater than 60° with respect to the axis of the engine and may approximate 90°. Thus, maximum freeing of the passages is obtained for the flux in the casing and a maximum air-braking effect by the doors is obtained without adversely affecting the guiding of the flux deflected from inside the annular passage towards the outside.

According to another characteristic of the invention, each door is hinged by its lateral edges between two beams extending parallel to the axis of the engine and connecting the fixed sections of the casing on each side of the intermediate section formed by the doors, these beams themselves forming a part of the casing. Thus, with the jack associated with each door, the total independence of the doors is ensured which may then be controlled independently of each other. This has the advantage of requiring no costly system for synchronizing the movement of the jacks and the doors and so of further reducing the weight of the reversal device. Another advantage is of allowing selective opening operation of the doors, some doors being able to remain closed while others open, which may be advantageous during certain manoeuvres or in certain applications.

There will now be described, by way of non limiting example, a preferred embodiment of the invention with reference to the accompanying drawings, in which.

In the following description, the reversal device of the invention is designed to equip a turbofan aircraft engine fixed under the wings and so it is this particular arrangement which will be described by way of example but it should be understood that this constitutes in no wise a limitation of the invention.

Figure 1:
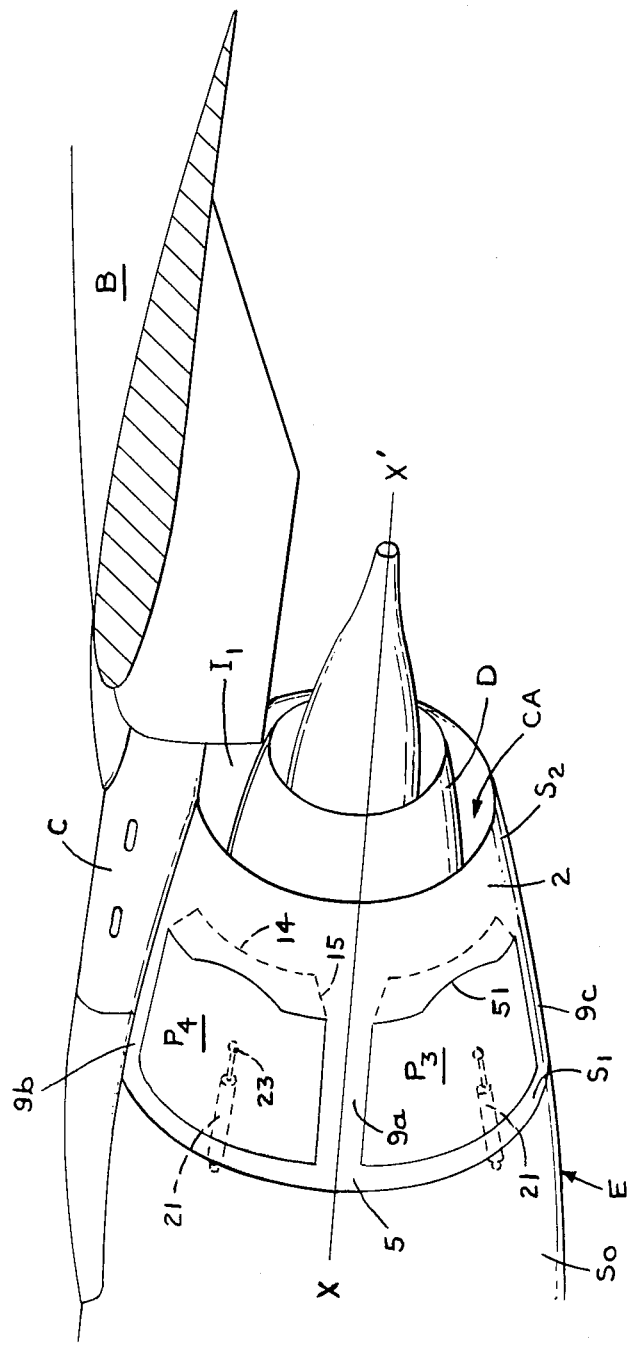
FIG. 1 is a schematical side view in perspective of an aircraft engine equipped with a thrust reversal device in accordance with the invention, shown in the retracted position.
Figure 2:
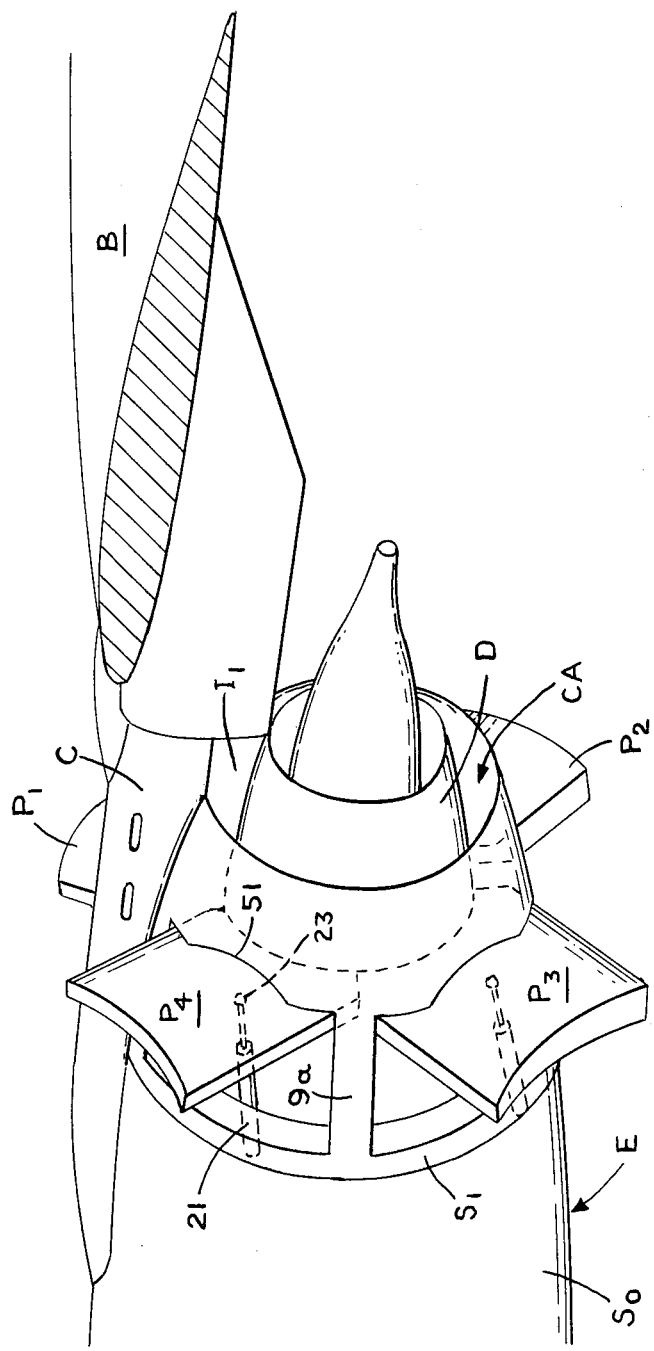
FIG. 2 is a view similar to FIG. 1 showing the reversal device opened out in its active position.
Figure 3:
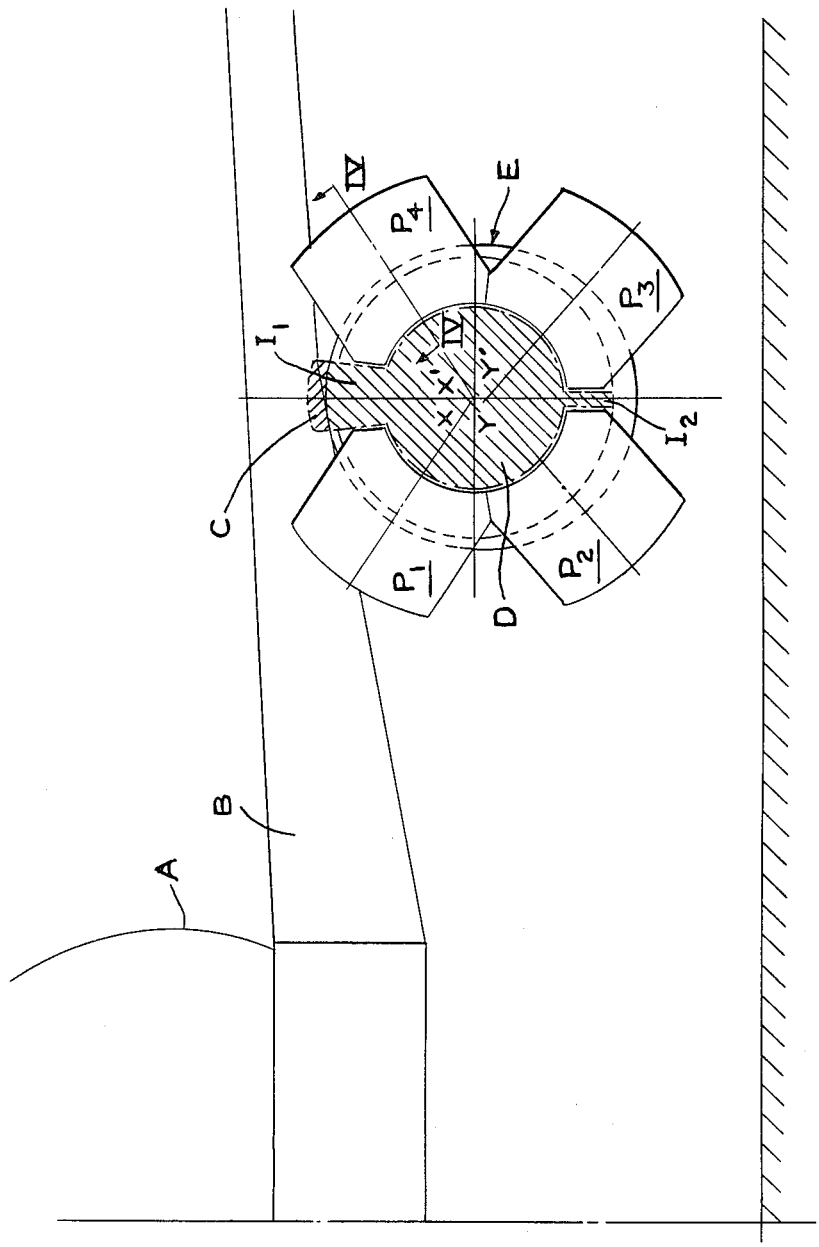
FIG. 3 is a front view of the device of FIG. 2.

In FIG. 3, there is shown schematically at A the air-frame of an aircraft and at B a wing under which is fixed by means of a conventional strut C, an engine structure D whose longitudinal axis is represented at x—x'. As can be seen in FIGS. 1 to 5, this engine structure D is surrounded by an annular casing designated generally at E, which defines with the external surface 1 of engine D an annular passage CA in which flows from upstream (on the left looking at FIGS. 1, 2 and 4) to downstream a cold gas flux propelled conventionally by a blower or front fan (not shown) mounted on the structure of the engine.

Figure 4:
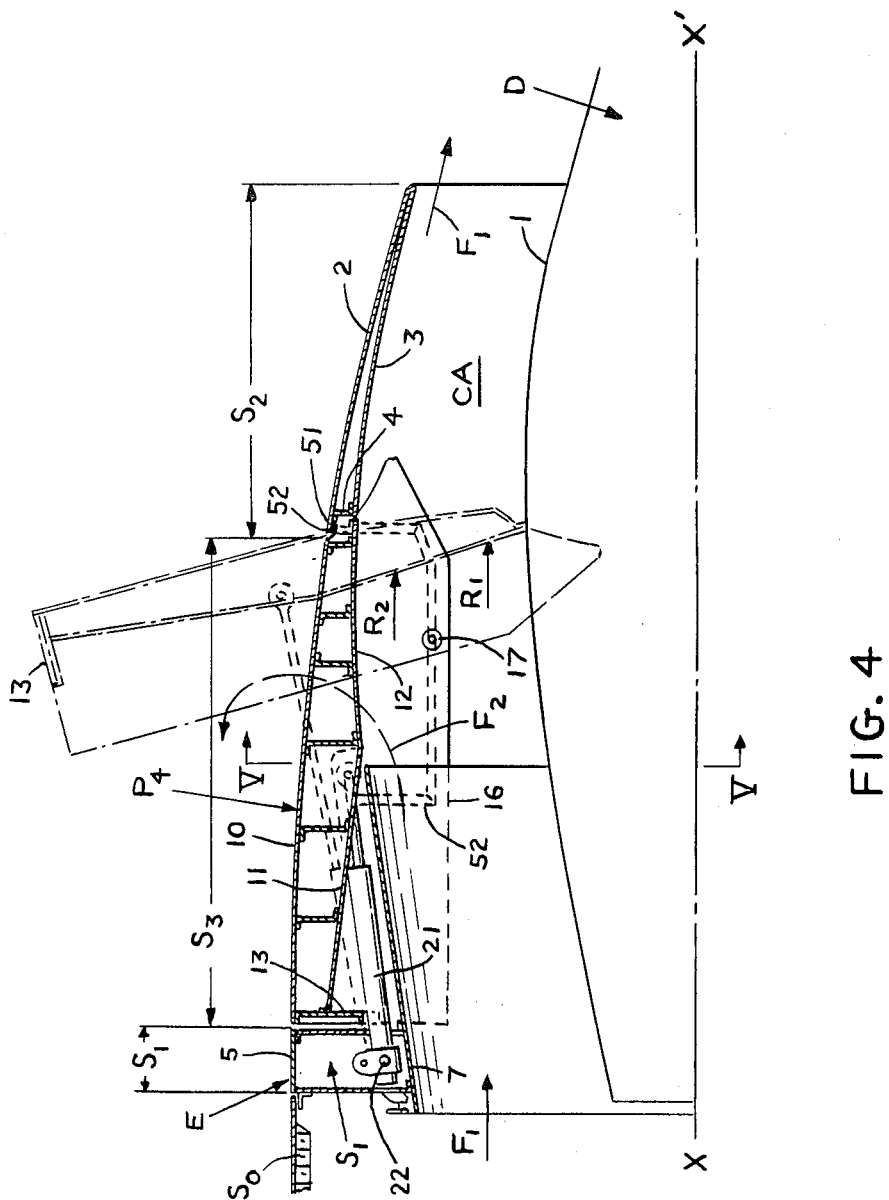
FIG. 4 is a partial longitudinal view in section of a part of the device along line IV—IV of FIG. 3.
Figure 5:
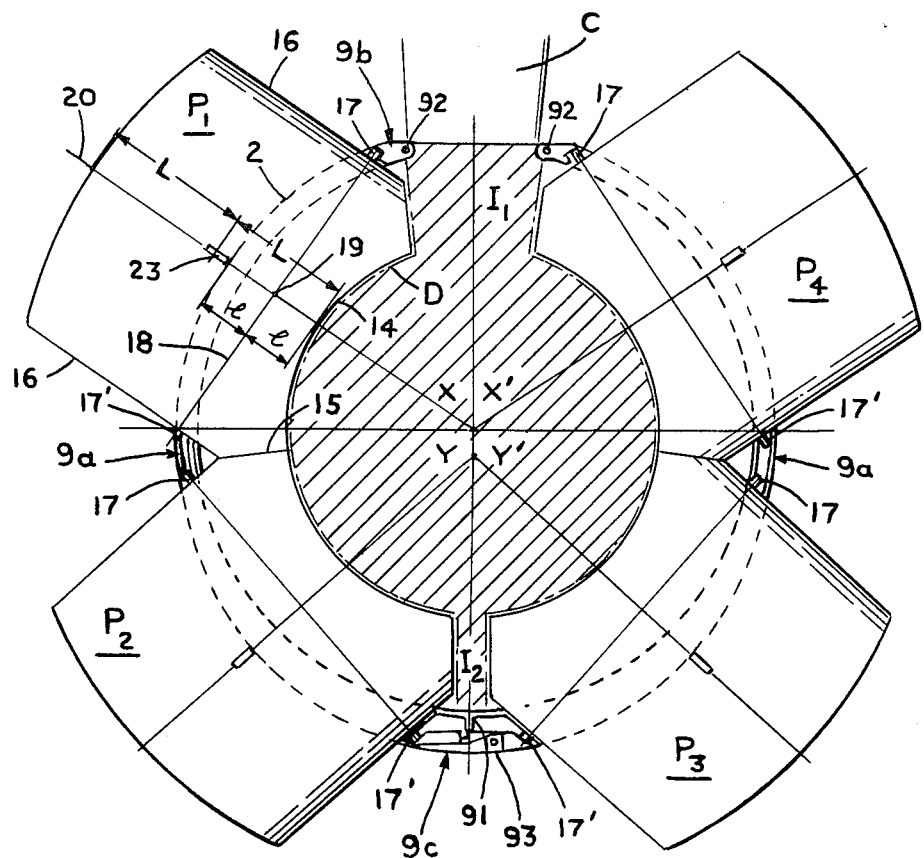
FIG. 5 is a cross section along line V—V of FIG. 4.

Casing E comprises a front engine cover section SO, outside the scope of the invention, and a rear body comprising the fixed upstream S1 and downstream S2 sections which are connected together by longitudinal beams 9a, 9b and 9c (see FIG. 5). The intermediate section S3 is formed by mobile elements or doors (which in the example shown are four in number) P1, P2, P3, P4, these doors being pivotable from a retracted position shown with a continuous line in FIGS. 1 and 4, in which position said doors complete the casing and, during normal flight of the aircraft, ensure guidance of the gas flow from upstream to downstream in the direction of arrow F1 of FIG. 4, to an opened-out thrust reversal position shown with a continuous line in FIGS. 2, 3, 5 and with a broken line in FIG. 4, said doors, in this position, closing off the annular passage CA and freeing lateral passages in the casing through which the flux or flow is directed outwardly radially in the direction of arrow F2.

The fixed downstream section S2 has a double skin structure, an outer skin 2 and an inner skin 3, spaced apart at the front from skin 2 by a stiffener 4, the upstream end of the outer skin 2 projecting slightly at 51 with respect to stiffener 4.

The fixed upstream section S1 is an annular box between an outer skin 5 and the front of the inner ring 7. Beams 9b and 9c hold in position, through the walls of islands I1 and I2, the internal casing of engine D. Ring 7 forms with skin 3 the outer wall of the annular passage CA.

Each of the doors is also formed from two skins coupled to each other by internal stiffening pieces which provide at the same time spacing therebetween. In the closed door position, the external skin 10 of the doors is located in the prolongation of the fixed skins 2 and 5.

The internal skin of the door has a convex shape so that the rear zone 12 is located (in the retracted door position) in the prolongation of skins 7 and 3 and completes the external wall of the annular passage CA, whereas the front zone 11 overlaps ring 7 while being progressively spaced further apart therefrom. At the front, the door comprises a deflector nose 13 substantially perpendicular to skin 10. The rear edge 14 of each door is shaped so that, in the opened-out position shown in FIG. 5, this edge 14 marries with the shape of the structure of engine D. Edge 14 is connected by oblique portions 15 to the two parallel lateral edges 16 of the door, the oblique portions 15 of each door mating with the corresponding parts 15 of the adjacent door or with the shape of island I1, I2, integral with the engine structure, as can be seen in FIG. 5. Thus, in the opened-out position, the rear of the doors closes off almost completely the annular passage CA.

Each door is provided with two pivots 17—17' situated respectively on each of the parallel lateral edges 16. The geometric pivoting axis 18 common to the two pivots 17—17' of each door is perpendicular to the median plane 20 of the door. For doors P1 and P4, pivot 17 is housed in beam 9b, adjacent strut C and pivot 17' is housed in the adjacent beam 9a, whereas for doors P2 and P3, pivot 17 is housed in one of the two opposite beams 9a and pivot 17' in the lower beam 9c, adjacent island I2. As can be seen more especially in FIG. 5, the pivoting axis 18 of the doors forms a "chord" of the annular passage CA, the middle point 19 of the chord being substantially at the same distance ("l") from the outer periphery of engine D and from the external wall of the casing. Point 19 is preferably situated also substantially in the lower quarter of the total length of the door.

With this arrangement, it will be readily understood that when the doors pivot to their opened-out position, flux F1 exerts a thrust R1 on the rear part of the door situated under the pivoting axis, this thrust R1 opposing opening thereof. But, as soon as opening begins, flux F1 exerts an antagonistic thrust R2 (in the opening direction) on the zone of the door situated above the pivoting axis 17—17', these thrusts R1 and R2 practically balancing out because of the substantially equivalent areas on which they exert a force. It follows that the force required from the jacks for opening the doors is relatively small and may even be a braking force.

Furthermore, still because of this arrangement of the pivoting axis, since the rear part of the door is of reduced length it allows opening of the door above 60° with respect to the longitudinal axis of the engine and could reach 90° while maintaining section S2 fixed. Thus, the radial passages provided in the casing for deflecting the flow towards the outside are freed to a very great extent and the air-braking action of the doors is increased in considerable proportions, which effect also acts in the opening direction of the doors. Further, as can be seen in FIGS. 4 and 5, more than half of the surface of the doors projects outside the casing, which further facilitates deflection and guidance of the flux outwardly in the direction of arrow F2.

Each door is actuated in the example shown by a single jack 21, which is a preferred arrangement but in no wise limitative. Two or more jacks could in fact be used if required. However, given the excellent mechanical conditions in which the jack operates because of the selected door geometry, the use of a single jack per door reduces the weight of the reversal system.

The foot of the cylinder of jack 21 is hinged at 22 to box S1, whereas the end of the rod is coupled at 23 to a fork-joint provided approximately in the center of the internal wall of the door, i.e. at a point located on the median axis 20 of the door and at an equal distance L from the front and the rear thereof.

It will be noted that the four jacks may be independent of each other, actuation thereof being possibly not synchronized; since the doors are independent of each other, opening of the doors may in fact accomodate slight staggering from one door to another. This arrangement also allows some only of the doors to be opened, for example one door out of two.

It will also be noted, as has already been mentioned, that during the opening phase of the doors, since the sum of the forces acting on the doors urges them to their open position, the jacks are subjected to tensile forces and their role is especially to brake the opening of the doors. It follows that the section and the power of the jacks may be minimal, resulting in a reduction in weight with respect to conventional reverser structures.

For sealing the doors in the closed position, a seal 52 is provided around the periphery of each of the four openings formed in the rear body (see FIG. 4).

Furthermore, to provide access to the engine structure, the rear body may be formed by two half shells (FIG. 5) hinged respectively at 92 to strut C, the opposite edges being in abutment at 91 and clamped together by a locking mechanism 93.

As can be seen in FIG. 5, in the opened-out position of the doors, the median planes 20 of the two upper doors P1 and P4 intersect on the engine axis x—x', whereas the median planes of the two lower doors P2 and P3 intersect along a line y—y' offset downwardly with respect to the engine axis. This is due to the fact that the lower pivots 17' of doors P2 and P3 are at a greater distance from the engine axis than the other six pivots of the doors.

This arrangement allows opening of the lower doors substantially at the same angle as the upper doors despite the difference in external shape of the lower part of the rear body (swelling due to the presence of equipment generally provided at the lower part of the engine).

We claim:

1. A thrust reversal device for an aircraft turbojet with an outer casing surrounding an engine structure and defining therewith an annular passage for the flow of a gas flux from an upstream region to a downstream region, the reversal device being formed by mobile elements of an intermediate section of the casing which are pivotable from an inactive position, in which they are located in the prolongation of the fixed part of the casing, to a thrust reversal position in which they extend transversely with respect to the annular passage which they close off while freeing in the casing a passage for radially deflecting the flux outwardly and downstream, the mobile elements of the intermediate section being formed by doors hinged in an intermediate zone of their length to the fixed part of the casing, said doors thus having upstream and downstream parts, which, in the reversal position, project respectively outside the casing for the upstream part and close off the annular passage for the downstream part, said doors being moreover operated by actuating members or jacks coupled, on the one hand, to the fixed upstream section of the casing and, on the other hand, in a region of the doors situated between their hinging zone to the casing and their upstream end, characterized in that the reversal device comprises, in addition to means (21) for actuating the doors (P1, P2, P3, P4), means for assisting the opening acting as soon as the doors begin to pivot; and wherein:

each of said doors is curved about a longitudinal axis (x—x') resulting in a transverse arcuate section, said assisting means being formed of said transverse arcuate section and a pair of pivots spaced apart along said transverse arcuate section in any one of said doors and upon which pivots said one door is hinged, said pivot defining a hinge axis disposed within said annular passage to place a portion of said door ahead of said hinge axis and a portion of said door behind said hinge axis simultaneously within said annular passage during a pivoting of said one door, whereby both of the portions of said one door receive forces from said gas flux in said annular passage for assistance during a pivoting of said one door.

2. The device according to claim 1, characterized in that the means for assisting the opening are formed by a zone of the doors themselves on which the thrust of the flux flowing in the annular passage (CA) exerts a reverse action to that which it exerts on the downstream part of the door (P1,P2,P3,P4).

3. The device according to claim 2, characterized in that the geometrical axis (18) about which each door pivots is formed by a chord of the annular passage (CA) whose middle point (19) is approximately at the same distance from the outer periphery of the casing and from the outer surface of the structure of the engine (D).

4. The device according to claim 3, characterized in that the point (23) at which the actuating jack is coupled to the door is situated substantially halfway between the upstream and downstream ends thereof and between the geometrical pivoting axis (18) and the upstream end (13).

5. The reversal device according to claim 3, characterized in that, for each door, the length of the downstream part measured in the median zone of the door is approximately three times shorter than the length of the upstream part.

6. The reversal device according to claim 1, characterized in that the opening angle of the doors in the opened-out position is between 60° and 90° with respect to said longitudinal axis of the engine (x—x').

7. The reversal device according to claim 1, characterized in that each door is hinged by its lateral edges (16) between two beams (9a, 9b, 9c) extending parallel to the axis (x—x') of the engine and connecting together the fixed sections of the casing situated upstream (S1) and downstream (S2) of the intermediate section (S3) formed by the doors, said beams forming a part of the casing with its internal and external skins.

8. The reversal device according to claim 1, characterized in that it is formed from four doors P1,P2,P3,P4) each covering a little less than 90° of the periphery of the casing.

9. The device according to claim 1, characterized in that, in the thrust reversal position, the internal door surface projecting outside the annular passage (CA) is greater than the door surface closing off said annular passage.

10. The device according to claim 1, characterized in that each door is operated independently of the others.

11. The device according to claim 1, adapted to an outer non circular rear body shape, characterized in that some of the pivoting points of the doors (17—17') are at different distances from the axis (x—x') of the engine so as to allow an opening angle substantially identical for all the doors.

* * * * *